(12) United States Patent
Watanabe

(10) Patent No.: US 12,420,903 B2
(45) Date of Patent: Sep. 23, 2025

(54) MARINE VESSEL, MARINE VESSEL STEERING SYSTEM, AND MARINE VESSEL STEERING MECHANISM

(71) Applicant: YAMAHA HATSUDOKI KABUSHIKI KAISHA, Iwata (JP)

(72) Inventor: Yoshikazu Watanabe, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 490 days.

(21) Appl. No.: 17/956,893

(22) Filed: Sep. 30, 2022

(65) Prior Publication Data

US 2023/0192261 A1     Jun. 22, 2023

(30) Foreign Application Priority Data

Dec. 16, 2021  (JP) ................ 2021-204458

(51) Int. Cl.
    *B63H 25/02*   (2006.01)
    *B63B 45/06*   (2006.01)
    *B63B 45/08*   (2006.01)
    *B63H 20/10*   (2006.01)

(52) U.S. Cl.
    CPC ........... *B63H 25/02* (2013.01); *B63B 45/06* (2013.01); *B63B 45/08* (2013.01); *B63H 20/10* (2013.01); *B63H 2025/022* (2013.01)

(58) Field of Classification Search
    CPC .. B63H 25/02; B63H 2025/022; B63H 20/10; B63B 45/06; B63B 45/08
    See application file for complete search history.

(56) References Cited

U.S. PATENT DOCUMENTS

| | | | |
|---|---|---|---|
| 7,278,367 B1 * | 10/2007 | Gonring | B63H 21/213 |
| | | | 200/61.57 |
| 2019/0071112 A1 | 3/2019 | Toddenroth et al. | |
| 2019/0291769 A1 | 9/2019 | Kim et al. | |

FOREIGN PATENT DOCUMENTS

| | | | | |
|---|---|---|---|---|
| EP | 3693265 A1 | 8/2020 | | |
| GB | 2560381 A | 9/2018 | | |
| WO | WO-2007035119 A1 * | 3/2007 | ............. | B63H 25/02 |

OTHER PUBLICATIONS

Czone, "2022 Czone Catalog", Retrieved from the Internet https://www.delzer.com/oneasg/czn_cat_003/, 2020, 68 pages.
Extended European Search Report in EP22202987.8, mailed May 15, 2023, 7 pages.

* cited by examiner

*Primary Examiner* — Stephen P Avila
(74) *Attorney, Agent, or Firm* — Keating & Bennett, LLP

(57) ABSTRACT

A marine vessel includes a hull and a steering system. The steering system includes at least one nautical equipment, a steering mechanism to adjust a traveling direction of the hull, and an input terminal to receive an input from a user. The steering mechanism includes a steering wheel with an operation switch to operate the at least one nautical equipment. The input terminal is operable to allow the user to associate the at least one nautical equipment with the operation switch.

9 Claims, 5 Drawing Sheets

MARINE VESSEL, MARINE VESSEL STEERING SYSTEM, AND MARINE VESSEL STEERING MECHANISM

CROSS REFERENCE TO RELATED APPLICATIONS

This application claims the benefit of priority to Japanese Patent Application No. 2021-204458 filed on Dec. 16, 2021. The entire contents of this application are hereby incorporated herein by reference.

BACKGROUND OF THE INVENTION

1. Field of the Invention

The present invention relates to marine vessels, marine vessel steering systems, and marine vessel steering mechanisms.

2. Description of the Related Art

In conventional marine vessels, switches are connected to respective pieces of nautical equipment, such as a horn and a lighting fixture, one-to-one by wiring. On the other hand, for the purpose of sharing data among pieces of nautical equipment and facilitating the configuration of a marine vessel steering system, recent marine vessels employ a CAN (Controller Area Network), on which nodes corresponding to switches and respective pieces of nautical equipment are connected to each other via a common bus. In such marine vessels, switches are gathered into a switch panel or displayed on a display having a touch panel function, and the switch panel or the display is typically placed on a console panel in a vessel cockpit (see, for example, "2022 CZone Catalog", pages 60-61, ON BOARD MARINE GROUP LTD, Internet URL: https://www.delzer.com/oneasg/czn-_cat_003/) together with a remote control switch and a joystick. A steering wheel is also placed in the vessel cockpit.

Such an arrangement results in a lack of space in the console panel of the vessel cockpit making it difficult to place other switches or equipment on the console panel. Therefore, there is room for improvement in terms of flexibility of switch layout.

Furthermore, a vessel operator holds a steering wheel during normal navigation, while the steering wheel is located away from the console panel of the vessel cockpit. As a result, the vessel operator needs to reach to operate the switches in the switch panel located on the console panel of the vessel cockpit during the navigation and, in some cases, needs to lean his/her body toward the console panel of the vessel cockpit. Therefore, there is room for improvement also in terms of switch operability.

SUMMARY OF THE INVENTION

Preferred embodiments of the present invention provide marine vessels, marine vessel steering systems, and marine vessel steering mechanisms that each improve the flexibility of switch layout and improve switch operability.

According to a preferred embodiment of the present invention, a marine vessel includes a hull and a steering system. The steering system includes at least one nautical equipment, a steering mechanism to adjust a traveling direction of the hull, and an input terminal to receive an input from a user. The steering mechanism includes a steering wheel with an operation switch to operate the at least one nautical equipment. The input terminal is operable to allow the user to associate the at least one nautical equipment with the operation switch.

According to another preferred embodiment of the present invention, a steering system for a marine vessel includes at least one nautical equipment, a steering mechanism to adjust a traveling direction of a hull of the marine vessel, and an input terminal to receive an input from a user. The steering mechanism includes a steering wheel with an operation switch to operate the at least one nautical equipment. The input terminal is operable to allow the user to associate the at least one nautical equipment with the operation switch.

According to another preferred embodiment of the present invention, a steering mechanism is provided for a marine vessel equipped with at least one nautical equipment. The steering mechanism includes a steering wheel with an operation switch to operate the at least one nautical equipment. The operation switch is operable to be associated with the at least one nautical equipment through an input terminal that receives an input from a user.

According to the above examples, the steering wheel of the steering mechanism is provided with at least one operation switch to operate nautical equipment, which eliminates the need to place operation switches to operate nautical equipment on a console panel of a vessel cockpit. This makes it easier to place other switches on the console panel of the vessel cockpit, thus improving flexibility of switch layout on the console panel of the vessel cockpit. Further, a vessel operator is able to easily operate, without taking a hand off the steering wheel, the operation switch to operate nautical equipment, which eliminates the need to reach to operate the nautical equipment and improves also the operability of the operation switch to operate the nautical equipment.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
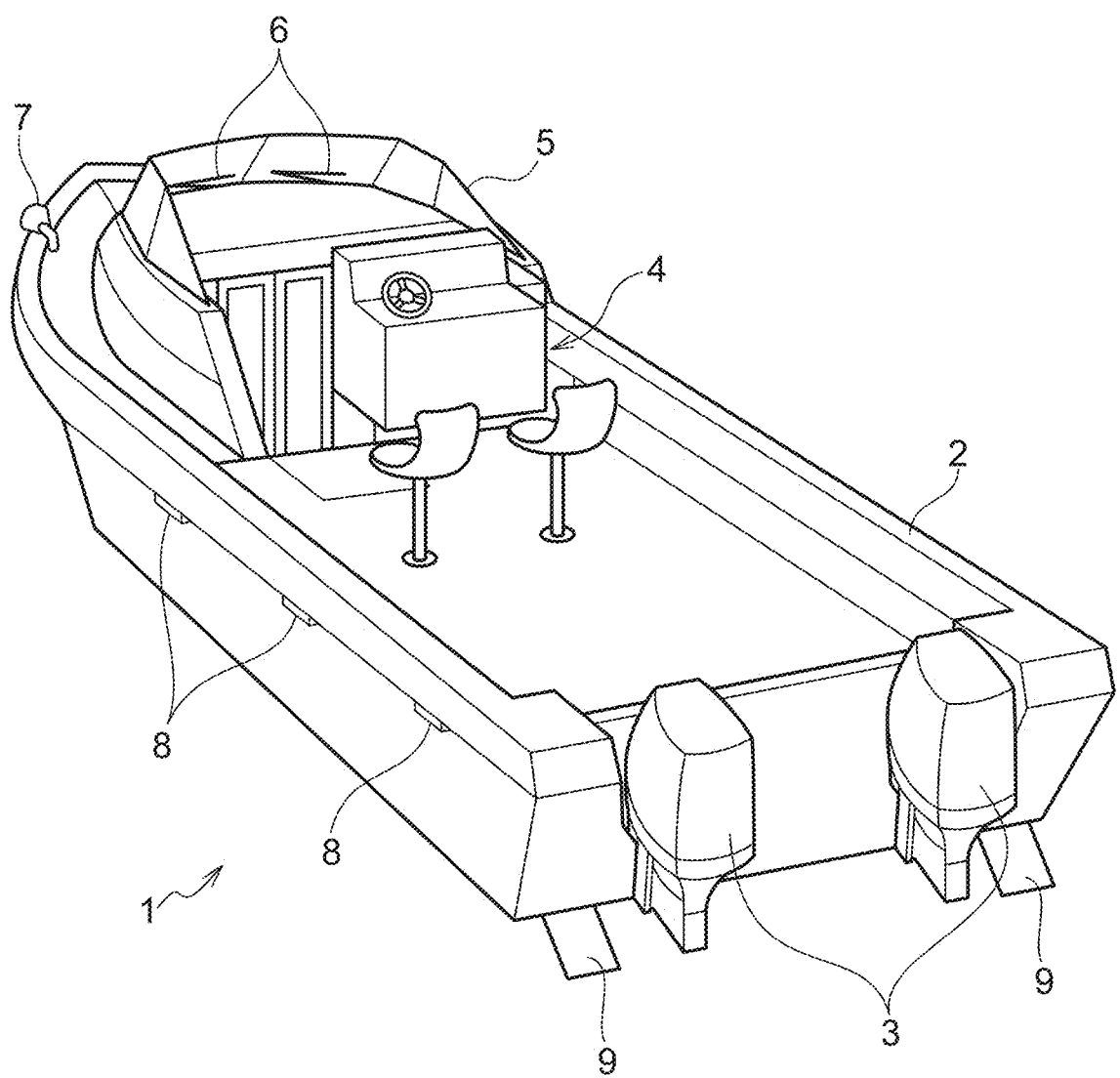
FIG. 1 is a perspective view of a marine vessel including a marine vessel steering mechanism according to a preferred embodiment of the present invention.

FIG. 1 is a perspective view of a marine vessel including a marine vessel steering mechanism according to a preferred embodiment of the present invention. A marine vessel 1 includes a hull 2 and a plurality of (two in this case) outboard motors 3 functioning as marine vessel propulsion devices mounted on the hull 2. Each of the outboard motors 3 includes a power source, which is an engine or an internal combustion engine, and a propeller, and generates thrust by the propeller being rotated with a driving force of the engine. Note that the number of outboard motors 3 included in the marine vessel 1 is not limited to two and may be one or three or more. Each of the outboard motors 3 may include an electric motor as the power source or may include both the engine and the electric motor as the power source. The outboard motors 3 are attached side by side to the stern of the hull 2 so as to be movable in the up-down direction (in other words, so as to be raised or lowered) relative to the hull 2 by an elevator transom 40 (see FIG. 4), which is an outboard motor elevator.

In the marine vessel 1, a vessel cockpit 4 is provided on the bow side or in the front of the hull 2. A windshield 5 is provided to cover the front of the vessel cockpit 4. The windshield 5 is provided with windshield wipers 6 to wipe off splashes or droplets on the windshield 5. A horn 7 that emits a warning sound is provided on the bow side of the hull 2. LED lights 8 (lighting fixtures or lighting devices) each including, for example, an LED lamp, to light up the hull 2 are provided on the port side of the hull 2.

Two trim tabs 9 are provided on the stern of the hull 2. The trim tabs 9 are posture control tabs to control the posture of the marine vessel 1 during sailing. For example, in a case where the marine vessel 1 is a planing boat, the trim tabs 9 turn around their stern sides (the front end) such that their rear ends descend during sailing, which generates lift on the hull 2. It lowers the bow side of the hull 2, thus shifting the hull 2 from a hump mode to a planing mode. Note that the windshield wipers 6, the horn 7, the LED lights 8, the trim tabs 9, and the elevator transom 40 are also referred to as nautical equipment because they are used while the marine vessel 1 is sailing.

Figure 2:
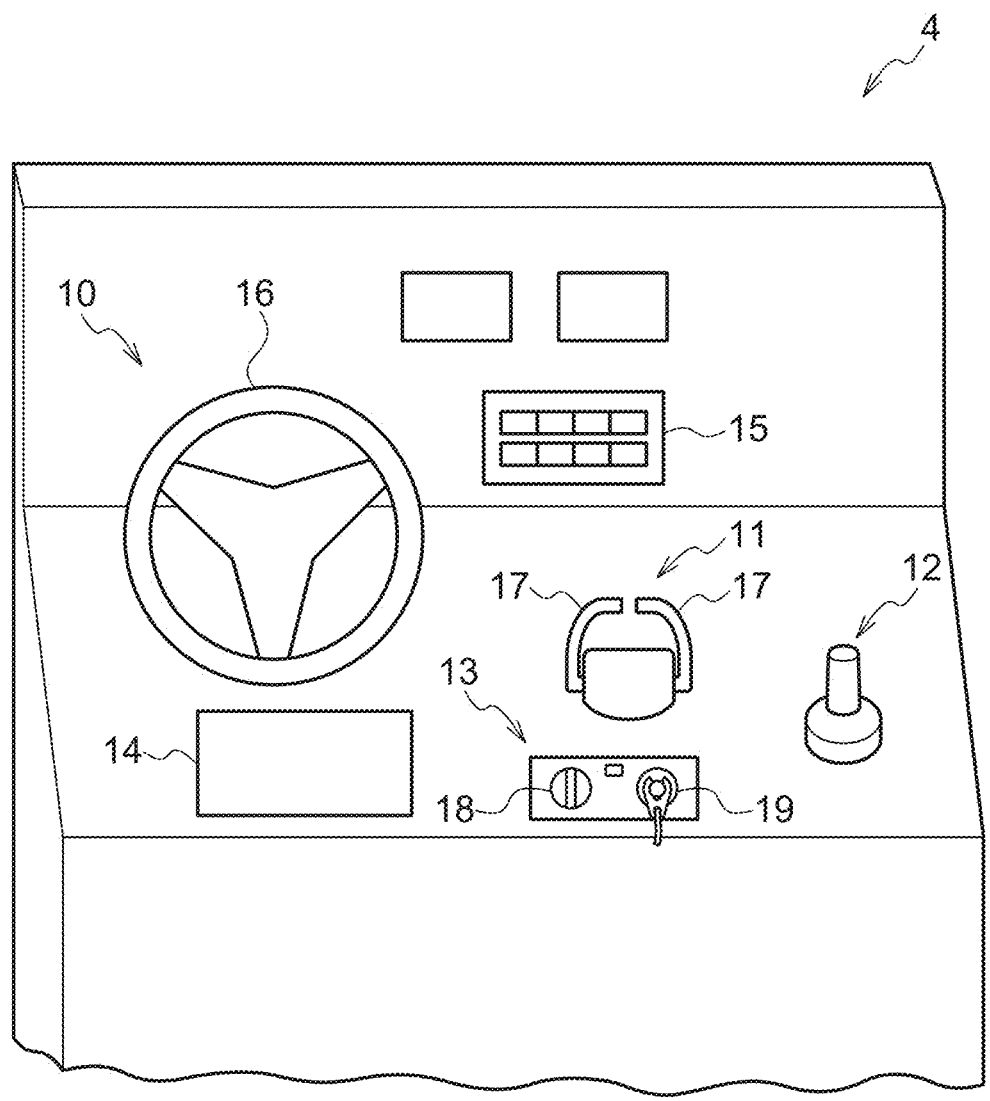
FIG. 2 is a perspective view of a main portion of a vessel cockpit according to a preferred embodiment of the present invention.

FIG. 2 is a perspective view of a main portion of the vessel cockpit 4. In the vessel cockpit 4, there are a marine vessel steering mechanism 10, a remote control switch 11, a joystick 12, a main operation unit 13, an MFD (Multi Function Display) 14, and an automatic navigation panel 15.

The marine vessel steering mechanism 10 allows a vessel operator (a user) to set a course of the marine vessel 1, that is, a device to adjust a traveling direction of the hull 2. The marine vessel steering mechanism 10 includes a steering wheel 16 that is rotatable so that a vessel operator is able to turn the marine vessel 1 to the left or the right by rotating the steering wheel 16 to the left or the right. The remote control switch 11 includes levers 17 corresponding to the outboard motors 3. By operating one of the levers 17, a vessel operator is able to switch the direction of the thrust generated by one of the outboard motors 3 corresponding to the operated lever 17 to a forward direction or a backward direction and adjust the output of the corresponding one of the outboard motors 3 to adjust the vessel speed.

The joystick 12 is operable to be tilted forward, backward, leftward, and rightward and to pivot around a pivot axis. The joystick 12 allows a vessel operator operating the joystick 12 to steer the marine vessel 1 with a course corresponding to the tilting direction of the joystick 12 and thrust corresponding to the tilting amount of the joystick 12. In a normal navigation mode, the outboard motors 3 operate mainly according to a vessel operator's operation on the marine vessel steering mechanism 10 and a vessel operator's operation on the remote control switch 11. On the other hand, in a joystick mode, the outboard motors 3 operate mainly according to the vessel operator's operation on the joystick 12. The normal navigation mode and the joystick mode is switched by an unillustrated changeover switch.

The main operation unit 13 includes a main switch 18 and an engine shut-off switch 19. One main switch 18 is provided in common to the outboard motors 3. The main switch 18 is an operator to collectively start and collectively stop the engines of the outboard motors 3. The engine shut-off switch 19 is a switch for emergency stop of the engines of the outboard motors 3.

The MFD 14 is, for example, a color LCD display. The MFD 14 functions as a display device that displays various kinds of information, has a touch panel function, and also functions as an input terminal that receives an input from a vessel operator. For example, the MED 14 displays the rotating speeds of the engines of the outboard motors 3 and the vessel speed of the marine vessel 1 and further is able to receive an input to associate any of the switches 28 to 37 on the steering wheel 16 with operation of at least one piece of nautical equipment, which will be described in detail below.

The automatic navigation panel 15 is a panel on which a plurality of shift switches to shift the marine vessel 1 to any one of a plurality of automatic navigation modes are placed. A vessel operator is able to shift the marine vessel 1 to a desired automatic navigation mode by operating a desired shift switch.

Figure 3:
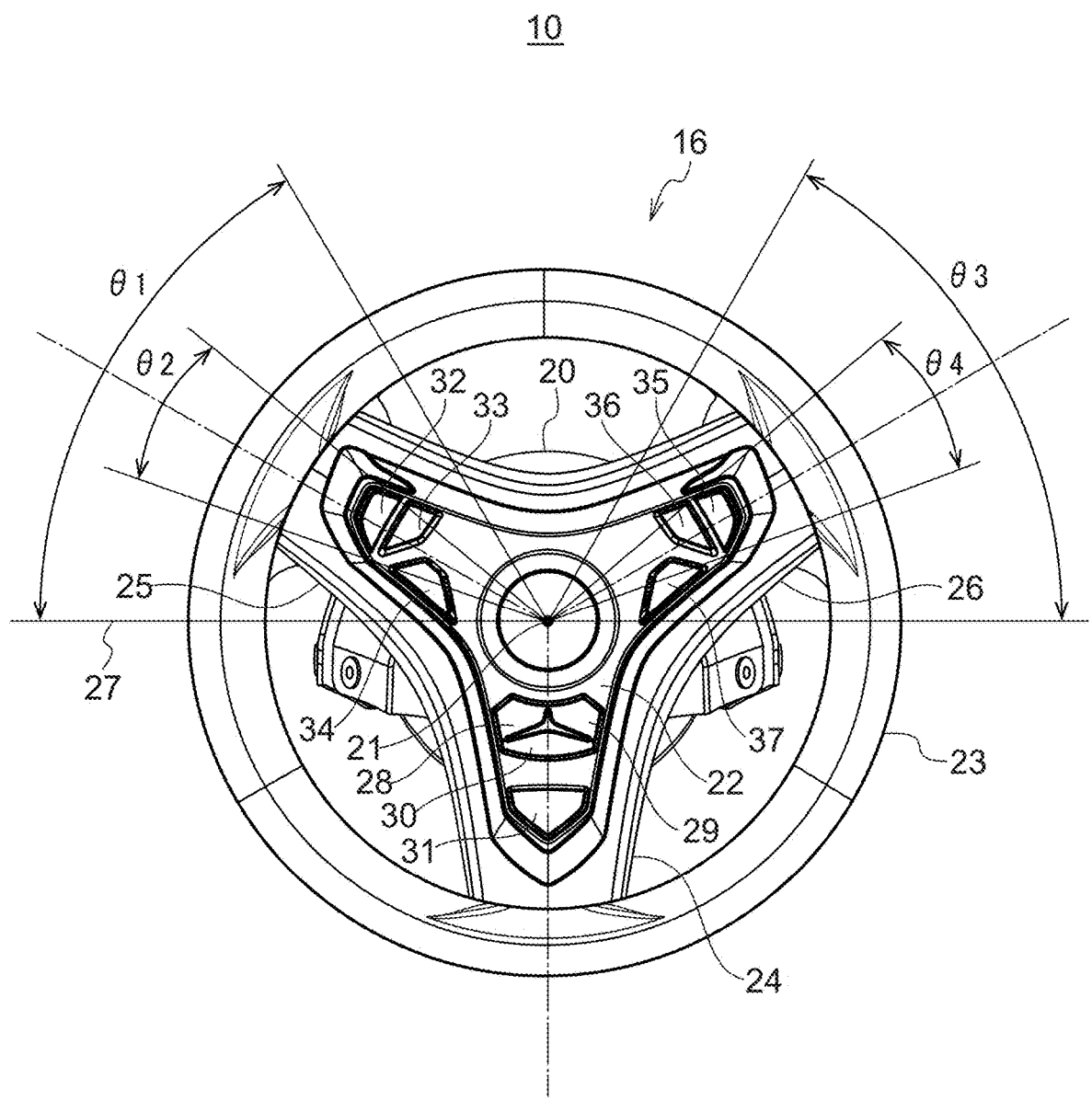
FIG. 3 is a diagram for explaining a configuration of a marine vessel steering mechanism.

FIG. 3 is a diagram for explaining a configuration of the marine vessel steering mechanism 10. FIG. 3 illustrates the marine vessel steering mechanism 10 as viewed from a vessel operator directly facing the marine vessel steering mechanism 10 (as viewed from the front). Note that the up-down direction and the left-right direction in FIG. 3 correspond to the up-down direction and the left-right direction of the marine vessel 1, respectively. The front side in FIG. 3 corresponds to the stern side of the marine vessel 1, and the back side in FIG. 3 corresponds to the bow side of the marine vessel 1.

In FIG. 3, the marine vessel steering mechanism 10 includes the steering wheel 16 and a column portion 20 that rotatably supports the steering wheel 16. The steering wheel 16 includes a central portion 22 supported by the column portion 20 to be rotatable around its rotation center (a steering axis) 21 in relation to the hull 2, an annular wheel portion 23, and at least two (three in this case) spoke portions 24 to 26 connecting the central portion 22 and the annular wheel portion 23. The steering wheel 16 is provided on the stern-side end of the column portion 20.

When the steering wheel 16 is in a position that causes the marine vessel 1 to travel straight, the spoke portion 24 is located below a virtual plane 27 extending through the rotation center 21 and parallel to the left-right direction and the spoke portion 24 extends from the rotation center 21 in the downward direction.

When the steering wheel 16 is in the position that causes the marine vessel 1 to travel straight, the spoke portion 25 is located above the virtual plane 27 and the spoke portion 25 extends from the rotation center 21 to define an angle in a range not less than 0° and not greater than about 60° (within the angle range indicated by θ1 in FIG. 3) with the virtual plane 27, preferably, an angle in a range not less than about 20° and not greater than about 40° (within the angle range indicated by θ2 in FIG. 3) with the virtual plane 27, measured clockwise in the direction of a circumference centered on the rotation center 21.

When the steering wheel 16 is in the position that causes the marine vessel 1 to travel straight, the spoke portion 26 is located above the virtual plane 27 and the spoke portion 26 extends from the rotation center 21 to define an angle in a range not less than 0° and not greater than about 60° (within the angle range indicated by θ3 in FIG. 3) with the virtual plane 27, preferably, an angle in a range not less than about 20° and not greater than about 40° (within the angle range indicated by θ4 in FIG. 3) with the virtual plane 27, measured counterclockwise in the direction of the circumference centered on the rotation center 21.

A plurality of switches 28 to 37 (operation switches) are located on the steering wheel 16. Specifically, the switches 28 to 31 are located on the spoke portion 24, the switches 32 to 34 are located on the spoke portion 25, and the switches 35 to 37 are located on the spoke portion 26. Each of the switches 28 to 37 may include, for example, a push switch that receives an operational input provided by a vessel operator pushing down the switch. In the present preferred embodiment, any one of the switches 28 to 37 functions as an operation switch to operate at least one of the windshield wipers 6, the horn 7, the LED lights 8, the trim tabs 9, or the elevator transom 40. Note that the number of spoke portions is not limited to three and may be two or may be more than three. Preferably, at least one operation switch is located on any or each of at least two spoke portions.

Figure 4:
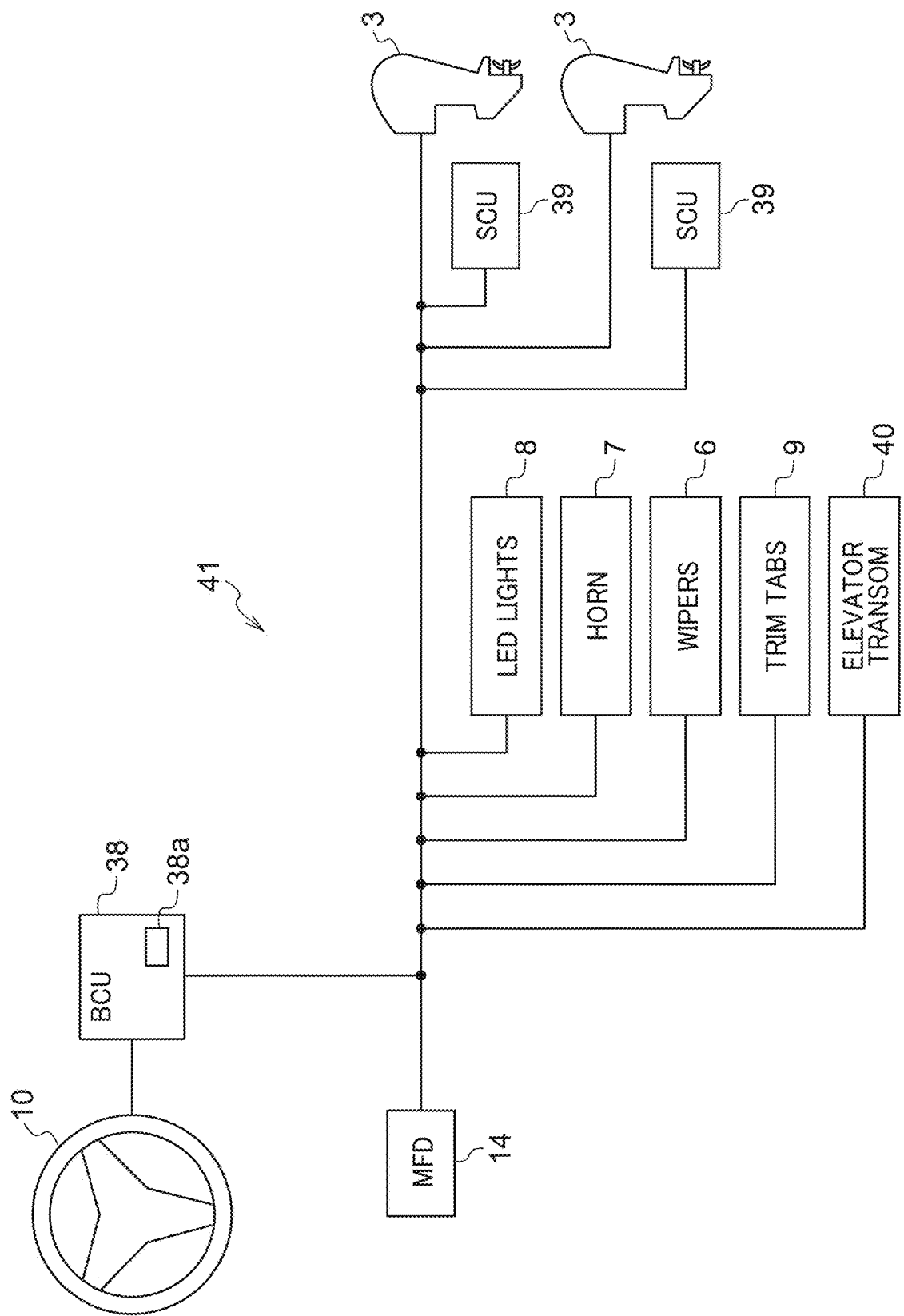
FIG. 4 is a block diagram for schematically explaining a configuration of a marine vessel steering system.

FIG. 4 is a block diagram schematically explaining a configuration of a steering system for the marine vessel 1. In FIG. 4, the steering system for the marine vessel 1 includes a BCU (Boat Control Unit) 38, which is also referred to as a controller, SCUs (Steering Control Units) 39, the windshield wipers 6, the horn 7, the LED lights 8, the trim tabs 9, and the elevator transom 40 together with the outboard motors 3, the marine vessel steering mechanism 10, and the MFD 14 which were described above.

The BCU 38, which is a main controller of the steering system, controls the operations of components of the steering system according to various programs. For example, the BCU 38 controls the engines of the outboard motors 3 according to vessel operator's operation on the levers 17 of the remote control switch 11. The SCUs 39 are provided to the respective outboard motors 3 and control steering units that horizontally turn the respective outboard motors 3 in relation to the hull 2 of the marine vessel 1 to change the acting directions of the thrust of the outboard motors 3.

In the steering system illustrated in FIG. 4, the components of the steering system are connected to one another by a CAN (Control Area Network) 41, which is a network in which a plurality of nodes are individually connected to a bus. In the CAN 41, an operational input to any of the plurality of switches 28 to 37 on the steering wheel 16 is converted into a digital signal and is transmitted to the BCU 38 via the bus. The CAN 41 is constructed based on various standards. For example, in the marine vessel 1, the CAN 41 is constructed based on the standards of the NEMA 2000 (which is a trademark of the National Marine Electronics Association).

In the steering system illustrated in FIG. 4, a vessel operator is able to freely associate any of the plurality of switches 28 to 37 of the steering wheel 16 with the operation of at least one of the windshield wipers 6, the horn 7, the LED lights 8, the trim tabs 9, or the elevator transom 40. Specifically, a vessel operator selects one of the plurality of switches 28 to 37 on the MFD 14 and then selects at least one piece of nautical equipment that the vessel operator desires to operate with the selected switch. In response to the selection, the BCU 38 associates the switch and the at least one piece of nautical equipment selected by the vessel operator, and then stores information on the association in a memory (a storage unit) 38a in the BCU 38 itself. Accordingly, in response to an operational input of a vessel operator pushing down one of the switches 28 to 37, the BCU 38 refers to the information on the association stored in the memory 38a and operates or activates the at least one piece of nautical equipment associated with the switch.

For example, in a case where operation of the horn 7 has been associated with the switch 32, the horn 7 emits a warning sound in response to a vessel operator pushing down the switch 32. In another case where operation of the windshield wipers 6 has been associated with the switch 33, the windshield wipers 6 are activated in response to a vessel operator pushing down the switch 33. In another case where operation of the LED lights 8 have been associated with the switch 35, the LED lights 8 are turned on in response to a vessel operator pushing down the switch 35.

A plurality of operation switches may be associated with multiple types of operations of a piece of nautical equipment. For example, the switch 36 and the switch 37 may be selected as switches to operate one of the trim tabs 9, so that a rise of the one of the trim tabs 9 is associated with the switch 36, and a lowering of the one of the trim tabs 9 is associated with the switch 37. The switch 30 and the switch 31 may be selected as switches to operate the elevator transom 40, so that a movement in the upward direction of the outboard motors 3 in relation to the hull 2 is associated with the switch 30, and a movement in the downward direction of the outboard motors 3 in relation to the hull 2 is associated with the switch 31.

Further, the MED 14 allows a vessel operator to set in detail the vessel operator' operation to be performed on a switch associated with operation of a piece of nautical equipment and the function of the piece of nautical equipment to be activated in response to the vessel operator' operation. For example, in a case where operation of the horn 7 is associated with the switch 32, a vessel operator is able to set the functions of the horn 7 to be activated, such that the horn 7 continuously emits a warning sound in response to a vessel operator pressing and holding down (long-pressing) the switch 32 and, and the horn 7 intermittently emits a warning sound in response to a vessel operator repeatedly pressing the switch 32. In a case where operation of one of the trim tabs 9 is associated with the switch 36 and the switch 37, a vessel operator is able to set the functions of the one of the trim tabs 9 to be activated as follows. In response to a vessel operator strongly pressing the switch 36, the one of the trim tabs 9 rises at once to the highest position. In response to a vessel operator weakly pressing the switch 36, the one of the trim tabs 9 continues to rise only while the switch 36 is pressed. In response to a vessel operator strongly pressing the switch 37, the one of the trim tabs 9 lowers at once to the lowest position. In response to a vessel operator weakly pressing the switch 37, the one of the trim tabs 9 continues to lower only while the switch 37 is pressed.

Note that the above-described associations of the operations of nautical equipment with the respective switches were given just for explanation purposes. A vessel operator may freely decide an operation of which piece of nautical equipment is associated with which switch. Since the windshield wipers 6, the horn 7, the LED lights 8, and the trim tabs 9 are examples of nautical equipment to be activated during sailing of the marine vessel 1, the operations thereof are preferably associated with respective switches (for example, the switches 32, 33, 35, and 36) located in a range that the thumb of a vessel operator holding the annular wheel portion 23 is able to reach. It eliminates a need for a vessel operator to take his/her hand off the annular wheel portion 23 during sailing of the marine vessel 1 in order to operate the nautical equipment and makes it easier to keep the course of the marine vessel 1. A vessel operator is able to perform the associations of the operations of nautical equipment with the respective switches at any time. For example, a vessel operator may perform the associations before departure, or may perform the associations during sailing.

Recent marine vessels are configured to support an automatic navigation mode and a fixed point holding mode. In the automatic navigation mode, a marine vessel automatically keeps its courses even if a vessel operator does not operate a steering wheel. In the fixed point holding mode, the movement of a marine vessel, which is not sailing, is automatically controlled such that the marine vessel continues to stay at one point (a predetermined position).

There are multiple variations of the automatic navigation mode and multiple variations of the fixed point holding mode, which are supported by the marine vessel. The variations of the automatic navigation mode include, for example, a "Course Hold" mode (a course holding mode) and a "Heading Hold" mode (a traveling direction maintaining mode). The variations of the fixed point holding mode include, for example, a FishPoint mode (a position maintaining mode), a DriftPoint mode (a bow direction maintaining mode), and the StayPoint mode (a position and bow direction maintaining mode), where FishPoint, DriftPoint, and StayPoint are trademarks of Yamaha Motor Co., Ltd.

The "Course Hold" mode is a mode in which thrusts of the outboard motors and acting directions of the thrusts are controlled such that a marine vessel follows a set course even if the marine vessel is subjected to a disturbance such as wind or water current while the marine vessel is sailing. The "Heading Hold" mode is a mode in which thrusts of the outboard motors and acting directions of the thrusts are controlled such that the direction of the bow is maintained in a set direction (a predetermined direction) even if the marine vessel is subjected to the disturbance while the marine vessel is sailing. The FishPoint mode is a mode in which thrusts of the outboard motors and acting directions of the thrusts are controlled to keep a marine vessel at one point (a predetermined position) even if the marine vessel is subjected to the disturbance while the marine vessel is not sailing. The DriftPoint mode is a mode in which thrusts of the outboard motors and acting directions of the thrusts are controlled such that the direction of the bow of a marine vessel is maintained in a set direction (a predetermined direction) even if the marine vessel is subjected to the disturbance while the marine vessel is not sailing. The StayPoint mode is a mode in which thrusts of the outboard motors and acting directions of the thrusts are controlled such that the direction of the bow of a marine vessel is maintained in a set direction and the marine vessel is kept at one point even if the marine vessel is subjected to the disturbance while the marine vessel is not sailing. Note that the modes are realized in the marine vessel 1 by the BCU 38 controlling the outboard motors 3 and the SCUs 39 according to a predetermined program.

In a preferred embodiment of the present invention, mode shift functions that shift the marine vessel 1 to the respective modes are associated with the switches 28 to 37 of the steering wheel 16. For example, a mode shift function to the DriftPoint mode is associated with the switch 28, a mode shift function to the StayPoint mode is associated with the switch 29, a mode shift function to the FishPoint mode is associated with the switch 30, a mode shift function to the "Heading Hold" mode is associated with the switch 33, and a mode shift function to the "Course Hold mode" is associated with the switch 36.

Incidentally, as explained above, since a vessel operator is able to freely decide an operation of which piece of nautical equipment is associated with which switch, a vessel operator may associate the operation of a piece of nautical equipment with a switch with which a mode shift function has been associated. In this case, whether to execute the associated mode shift function or perform operation of the associated piece of nautical equipment in response to vessel operator's operation on the switch, is switched according to, for example, an operational input to the changeover switch. As the changeover switch, a switch not associated with a mode shift function or operation of at least one nautical equipment should be selected among the switches 28 to 37. For example, the switch 31 may be used as the changeover switch. Note that it is preferable that the MFD 14 displays whether the associated mode shift function is executed or the operation of the associated piece of nautical equipment is performed.

In a preferred embodiment of the present invention, operations of at least one piece of nautical equipment are associated with the switches 28 to 37 provided together with the steering wheel 16 of the marine vessel steering mechanism 10. Consequently, it is possible to eliminate a need to locate switches to operate the nautical equipment on the console panel of the vessel cockpit 4. It is possible to locate other switches on the console panel of the vessel cockpit 4. Consequently, flexibility of a layout of the other switches is improved. In a preferred embodiment of the present invention, a vessel operator is able to freely decide which operation of which piece of nautical equipment is associated with which switch, which makes it possible to select or change a switch for the association in view of a frequency of use of the nautical equipment. Therefore, when operation of a piece of nautical equipment having a high frequency of use is associated with a switch located in a range that the thumb of the vessel operator holding the annular wheel portion 23 easily reaches, it improves convenience of the nautical equipment for the vessel operator.

Further, in a preferred embodiment of the present invention, the operations of pieces of nautical equipment are associated with the switches 28 to 37 provided together with the steering wheel 16, which allows a vessel operator to easily operate the pieces of nautical equipment without taking the hand off the steering wheel 16. Consequently, the vessel operator does not need to extend the hand to the switches located on the console panel of the vessel cockpit 4 in order to operate the nautical equipment. This results in improved operability of switches to operate the nautical equipment.

Furthermore, according to a preferred embodiment of the present invention, the steering system illustrated in FIG. 4 is easily constructed in the marine vessel 1 just by installing the steering wheel 16 equipped with the switches 28 to 37 onto the marine vessel 1 without placing switches to operate the nautical equipment on the console panel of the vessel cockpit 4. It easily achieves control of the operation of the nautical equipment with the switches.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

Figure 5:
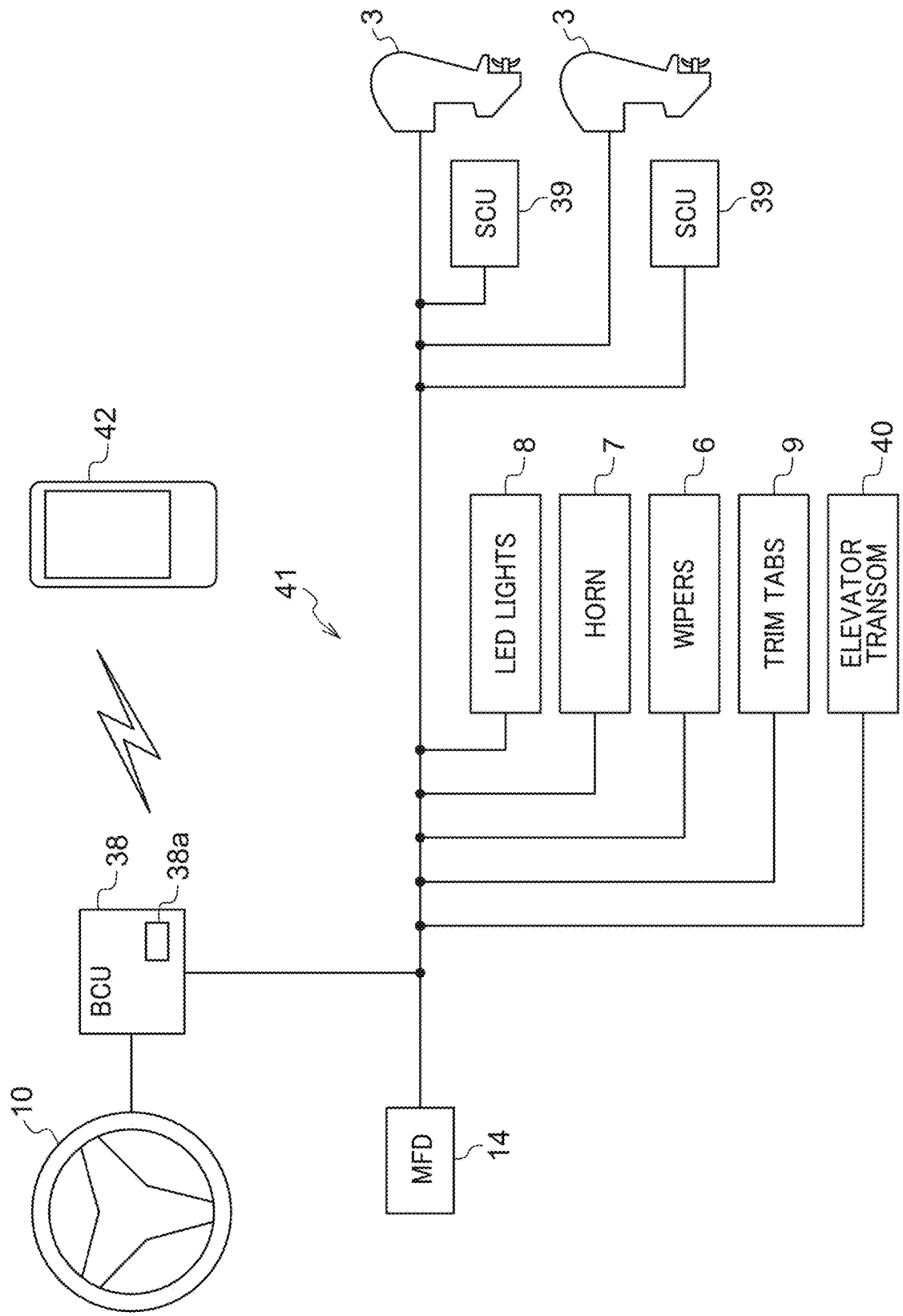
FIG. 5 is a block diagram schematically explaining a configuration of a variation of the marine vessel steering system.

As described above, in a preferred embodiment of the present invention, a vessel operator associates operation of at least one piece of nautical equipment with a desired switch via the MFD 14. However, for example, as illustrated in FIG. 5, the steering system for the marine vessel 1 may be communicable with an external mobile device, for example, a smartphone 42 (an input terminal) by near field communication (for example, Wi-Fi or Bluetooth) so that a vessel operator is able to associate operation of at least one nautical equipment with a desired switch via the smartphone 42.

Note that, in a preferred embodiment of the present invention, the marine vessel steering mechanism 10 is used for the marine vessel 1 equipped with two outboard motors 3. However, the marine vessel steering mechanism 10 may be used for any type of marine vessel. For example, the marine vessel steering mechanism 10 may be applied to a marine vessel equipped with an inboard/outboard motor or an inboard motor.

What is claimed is:

1. A marine vessel comprising:

a hull; and a steering system including at least one nautical equipment, a steering mechanism to adjust a traveling direction of the hull, an input terminal to receive an input from a user, and a controller; wherein the steering mechanism includes a steering wheel with an operation switch to operate the at least one nautical equipment;

the input terminal is operable to receive the input from the user to associate the at least one nautical equipment with the operation switch; and the controller is configured or programmed to associate the at least one nautical equipment with the operation switch according to the input received from the user via the input terminal.

2. The marine vessel according to claim 1, wherein the at least one nautical equipment and the operation switch are connected by a Control Area Network.

3. The marine vessel according to claim 1, wherein the input terminal includes a display or a mobile device.

4. The marine vessel according to claim 1, wherein the steering system further includes a storage to store information on association of the at least one nautical equipment and the operation switch.

5. The marine vessel according to claim 1, wherein the steering wheel includes a central portion rotatable around a rotation center thereof in relation to the hull, an annular wheel portion, and at least two spoke portions connecting the central portion and the wheel portion; and the operation switch is located on the at least two spoke portions.

6. The marine vessel according to claim 5, wherein the at least two spoke portions are located above a virtual plane extending through the rotation center and parallel to a left-right direction of the marine vessel and define respective angles with the virtual plane, each of the respective angles being in a range not less than 0° and not greater than about 60° as measured in a direction of a circumference centered on the rotation center; and the operation switch associated with at least one nautical equipment is operable to be activated during sailing of the marine vessel.

7. A marine vessel comprising:

a hull; and a steering system including at least one nautical equipment, a steering mechanism to adjust a traveling direction of the hull, and an input terminal to receive an input from a user; wherein the steering mechanism includes a steering wheel with an operation switch to operate the at least one nautical equipment;

the input terminal is operable to allow the user to associate the at least one nautical equipment with the operation switch;

the operation switch is associated with a mode shift function to shift the marine vessel to one of a position maintaining mode in which the marine vessel is kept in a predetermined position, a bow direction maintaining mode in which a direction of a bow of the marine vessel is maintained in a predetermined direction, and a position and bow direction maintaining mode in which the marine vessel is kept in the predetermined position and the direction of the bow of the marine vessel is maintained in the predetermined direction; and the steering wheel is further equipped with a changeover switch to switch whether to activate the at least one nautical equipment according to the user operation on the operation switch or execute the mode shift function according to the user operation on the operation switch.

8. The marine vessel according to claim 1, wherein the at least one nautical equipment includes at least one of a horn, a windshield wiper, a lighting fixture, a posture control tab, or an outboard motor elevator.

9. A steering system for a marine vessel, the steering system comprising:

at least one nautical equipment;

a steering mechanism to adjust a traveling direction of a hull of the marine vessel;

an input terminal to receive an input from a user; and a controller; wherein the steering mechanism includes a steering wheel with an operation switch to operate the at least one nautical equipment; and the input terminal is operable to receive the input from the user to associate the at least one nautical equipment with the operation switch; and the controller is configured or programmed to associate the at least one nautical equipment with the operation switch according to the input received from the user via the input terminal.

* * * * *